US011636090B2

United States Patent
Li et al.

(10) Patent No.: US 11,636,090 B2
(45) Date of Patent: Apr. 25, 2023

(54) METHOD AND SYSTEM FOR GRAPH-BASED PROBLEM DIAGNOSIS AND ROOT CAUSE ANALYSIS FOR IT OPERATION

(71) Applicant: INTERNATIONAL BUSINESS MACHINES CORPORATION, Armonk, NY (US)

(72) Inventors: Jia Qi Li, Beijing (CN); Fan Jing Meng, Beijing (CN); Pei Ni Liu, Beijing (CN); Zi Xiao Zhu, Beijing (CN); Matt Hogstrom, Cary, NC (US); Dong Sheng Li, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 16/819,141

(22) Filed: Mar. 15, 2020

(65) Prior Publication Data
US 2021/0286798 A1  Sep. 16, 2021

(51) Int. Cl.
*G06F 16/23* (2019.01)
*G06F 16/901* (2019.01)

(52) U.S. Cl.
CPC ...... *G06F 16/2365* (2019.01); *G06F 16/9024* (2019.01)

(58) Field of Classification Search
CPC .......................... G06F 16/2365; G06F 16/9024
See application file for complete search history.

(56) References Cited

U.S. PATENT DOCUMENTS

| 7,639,868 | B1 | 12/2009 | Regli et al. |
| 7,827,186 | B2 | 11/2010 | Hicks |
| 8,738,972 | B1 | 5/2014 | Bakman et al. |
| 9,244,983 | B2 | 1/2016 | Yang et al. |

(Continued)

OTHER PUBLICATIONS

List of IBM Patents or Patent Applications Treated as Related (2 pgs).

(Continued)

*Primary Examiner* — Ashish Thomas
*Assistant Examiner* — Dustin D Eyers
(74) *Attorney, Agent, or Firm* — Intelletek Law Group, PLLC; Gabriel Daniel, Esq.

(57) ABSTRACT

A computer-implemented method, system, and non-transitory machine readable medium for a graph-based analysis for an Information Technology (IT) operations includes generating a temporal graph by extracting one or more of operation objects, relations and attributes from operation data of workloads distributed across a plurality of levels of the IT operation within a predetermined time window. Anomalies are detected from the extracted operation data and annotating corresponding objects in the graph. A directional impact between corresponding objects on the temporal graph is determined, and the temporal graph is refined based on the determined directional impact. Accessible paths in the temporal graph indicating error propagation are searched, and potential causes for the detected anomalies in the temporal graph are identified. A list of the potential causes of the anomalies is generated, and a root cause ranked for each of the corresponding objects in the temporal graph.

20 Claims, 11 Drawing Sheets

(56) References Cited

U.S. PATENT DOCUMENTS

| | | |
|---|---|---|
| 10,373,094 B2 | 8/2019 | Naous et al. |
| 10,505,825 B1 | 12/2019 | Bettaiah et al. |
| 10,725,982 B2 | 7/2020 | Scheideler et al. |
| 11,244,345 B2 | 2/2022 | Pradeep |
| 2004/0078364 A1 | 4/2004 | Ripley |
| 2004/0143508 A1 | 7/2004 | Bohn |
| 2004/0243548 A1 | 12/2004 | Hulten et al. |
| 2007/0038938 A1 | 2/2007 | Canora |
| 2008/0184001 A1 | 7/2008 | Stager |
| 2008/0213768 A1 | 9/2008 | Cai et al. |
| 2009/0024555 A1 | 1/2009 | Rieck |
| 2010/0332540 A1 | 12/2010 | Moerchen et al. |
| 2011/0225173 A1 | 9/2011 | Gulhane |
| 2012/0323921 A1 | 12/2012 | Chen |
| 2014/0074764 A1 | 3/2014 | Duftler |
| 2015/0170022 A1* | 6/2015 | Malik .................... G06N 3/084 706/21 |
| 2015/0242384 A1* | 8/2015 | Reiter .................... G06F 40/186 715/202 |
| 2016/0124823 A1 | 5/2016 | Ruan et al. |
| 2017/0132060 A1* | 5/2017 | Nomura .............. G06F 11/0751 |
| 2017/0185910 A1 | 6/2017 | Appel et al. |
| 2017/0186249 A1* | 6/2017 | Bandy .................. G07C 5/0816 |
| 2017/0213127 A1 | 7/2017 | Duncan |
| 2017/0249200 A1 | 8/2017 | Mustafi et al. |
| 2017/0262429 A1* | 9/2017 | Harper .................... G06F 40/40 |
| 2017/0270154 A1 | 9/2017 | Stephens |
| 2019/0058643 A1* | 2/2019 | Knowles .............. G06F 11/301 |
| 2019/0095313 A1 | 3/2019 | Xu |
| 2019/0303459 A1 | 10/2019 | Yan |
| 2020/0004813 A1 | 1/2020 | Galitsky |
| 2022/0032982 A1 | 2/2022 | Shenton |

OTHER PUBLICATIONS

Mell, P. et al., "Recommendations of the National Institute of Standards and Technology"; NIST Special Publication 800-145 (2011); 7 pgs.

Wang, H. et al., "GRANO: Interactive Graphbased Root Cause Analysis for CloudNative Distributed Data Platform" VLDB Endowment (2019); vol. 12:12; pp. 1942-1945.

* cited by examiner

METHOD AND SYSTEM FOR GRAPH-BASED PROBLEM DIAGNOSIS AND ROOT CAUSE ANALYSIS FOR IT OPERATION

BACKGROUND

Technical Field

The present disclosure generally relates to dynamic system analysis. More particularly, the present disclosure relates to workload analysis in hybrid cloud or a multi-cloud environment.

Description of the Related Art

Hybrid cloud and multi-cloud computing are increasingly used to distribute workloads. Hybrid cloud computing and multi-cloud computing can utilize different systems to perform various tasks.

SUMMARY

According to various embodiments, a method, system and a non-transitory machine-readable medium for graph-based problem diagnosis and root cause analysis for Information Technology (IT) Operation is disclosed herein.

In one embodiment, a computer-implemented method for a graph-based analysis for an Information Technology (IT) operations includes generating a temporal graph by extracting one or more of operation objects, relations and attributes from operation data of workloads distributed across a plurality of levels of the IT operation within a predetermined time window. Anomalies or errors from the extracted operation data are detected and corresponding objects in the graph are annotated. A directional impact between corresponding objects on the temporal graph is determined, and refining of the temporal graph is based on the determined directional impact. Accessible paths in the temporal graph indicating error propagation are searched for, and potential causes for one or more of the detected anomalies or errors in the temporal graph are identified. A list of the potential causes of the anomalies or errors is generated for each of the corresponding objects in the temporal graph.

In an embodiment, the IT operations are performed in a hybrid cloud or multi-cloud environment from which the extracting of the operation objects from operation data is performed.

In an embodiment, the generating of the temporal graph includes extracting relations comprising one or more of correlation, type or direction.

In an embodiment, the detecting anomalies includes detecting one or more of metrics, time-series data, sequences, or graph-structure exceptions.

In an embodiment, the identifying of the potential causes of anomalies in the temporal graph includes determining one or more of a depth or level in the temporal graph and a deviation from an expected depth or level in the temporal graph.

In an embodiment, the determining of at least one root cause of the anomalies in the temporal graph, and the ranking of the identified potential causes of the anomalies based on the at least one root cause.

In an embodiment, the generating of the temporal graph includes generating a node and edge graph by the extracting of operation objects, relations and attributes, and each node is annotated.

In an embodiment, the list of the potential causes of the anomalies is generated for each of the annotated node. A root cause of the identified potential causes of the anomalies for each annotated node.

In an embodiment, the refining of the temporal graph comprises determining a directional impact between two nodes on the temporal graph and adjusting the edges.

In one embodiment, a system for a graph-based analysis for Information Technology (IT) operations includes a graph construction module is configured to generate a temporal graph extracted from operation objects, relations and attributes from operation data of workloads distributed across a plurality of levels of the IT operation within a predetermined time window. An anomaly detection and error annotation module is configured to detect anomalies and annotate corresponding objects in the temporal graph. An error propagation inference module is configured to determine a directional impact between corresponding objects on the temporal graph, refine the temporal graph based on the determined directional impact, search accessible paths in the temporal graph indicating error propagation, and identify potential causes of the anomalies for one or more of the detected anomalies in the temporal graph. A root cause ranking module is configured to generate a ranked list of the potential causes of the anomalies for each of the corresponding objects in the temporal graph.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1A:
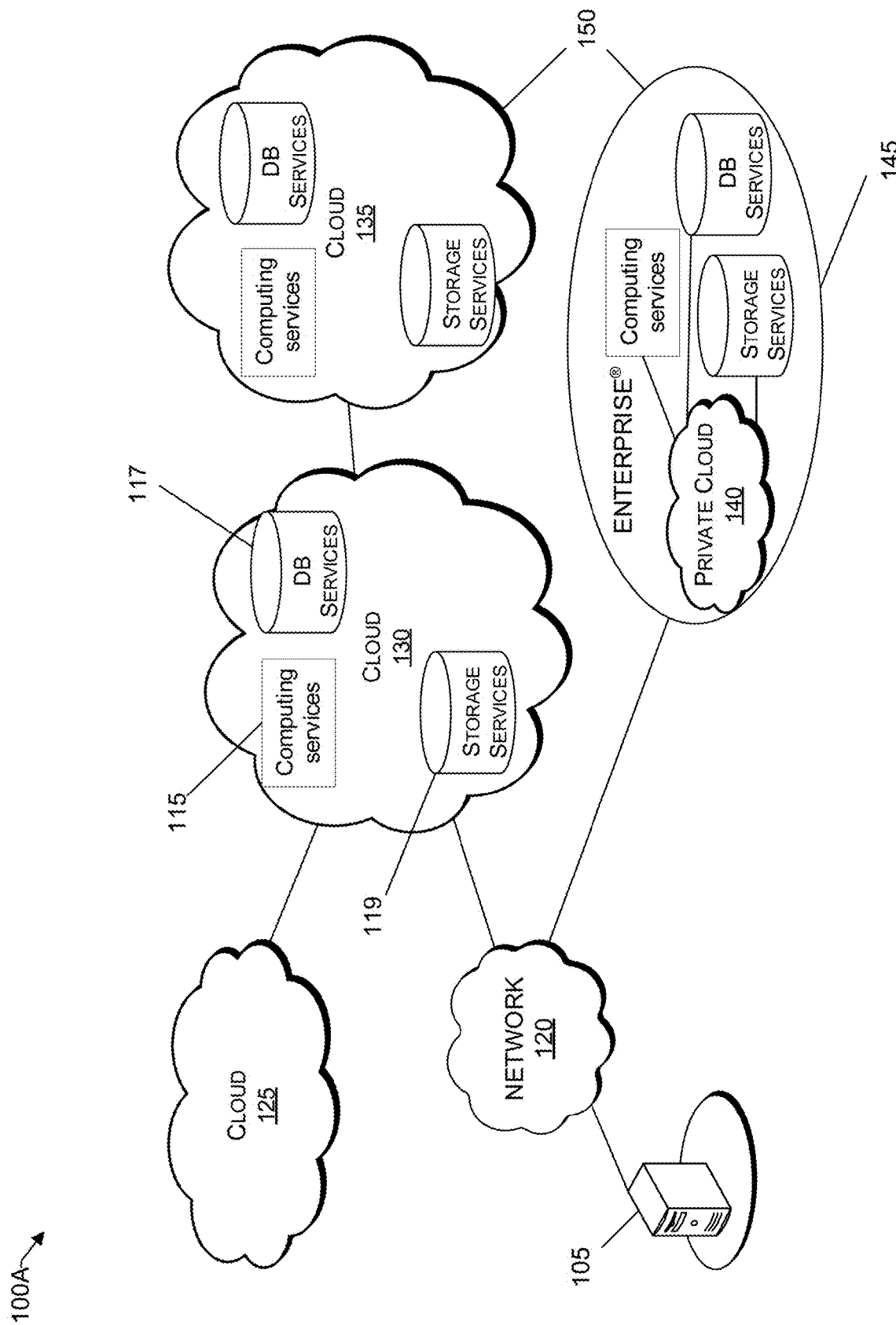
FIG. 1A is an illustration of a multi-cloud computing architecture, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, have been described at a relatively high-level, without detail, to avoid unnecessarily obscuring aspects of the present teachings. The method and systems of the present disclosure teach enhancing operation management through the detection of anomalies. It is to be understood that as used herein, the term "anomalies" includes errors, but is not limited to errors. In other words, unexpected occurrences, and/or occurrences that are more frequent or less frequent, take longer to execute, require excessive retries, than expected are to be considered as examples of anomalies.

According to an embodiment of the present disclosure, the diagnosis and root cause analysis of systems operation in a hybrid cloud or multi-cloud environment. A temporal graph can be constructed using operation data without pre-knowledge of dynamic systems.

A graph is constructed to depict the system operation more clearly by, for example, showing nodes associated with various operational objects. The nodes can represent, for example, a user, their workspace, their request, the applications, the host, etc., just to name a few non-limiting possible examples. Anomalies of operational objects can be detected from the nodes of the graphical data. For example, operational data are segmented into different distributive systems separately, such as monitoring, logging, events, ticketing and a Configuration Management Data Base (CMDB). In one embodiment, the operational objects include logs, alerts, events, etc. Correlation of these events can be used to infer, or to detect directly, a problem or problems. By connections or correlations of anomalies of operational objects in the graph, inferences can be taken to identify causes of errors, warnings, faults, notices, etc. regarding the various operations.

Aspects of the present disclosure are applicable to both hybrid cloud computing, and multi-cloud computing. Hybrid cloud computing is a type of strategy for operation of a single type of task. On the other hand, multi-cloud computing is a type of cloud management strategy in which several providers may be used to perform more than one type of task. It is to be understood that multi-cloud computing may include hybrid cloud computing as a component.

When workloads are distributed across multi-cloud computing environments, there is difficulty to detect, diagnose and fix problems seamlessly and efficiently. An aspect of the present disclosure permits is to diagnose problems in the IT environment as a whole. A specific level of the system, such as interactions between requested applications, or network connections, or communications between a host in the network. In the present disclosure, multiple levels of the system operation can be depicted for analysis and root cause monitoring and diagnosis of dynamic systems. The operational objects can vary from various dynamic to the infrastructure. according to an illustrative embodiment of the present disclosure, attributes of operational objects are extracted from operational data and a graph can visually depict operational objects.

The various aspects of the present disclosure provide an improvement in multi-cloud and hybrid cloud operation by providing multiple level monitoring and detection of operations, errors, faults, and warnings of various platforms that are operating across multiple clouds that would otherwise present significant difficulty in such monitoring and detection. In addition, the present disclosure provides for an improvement in computer operations that is capable of monitoring multiple levels of multi-cloud operation from the user operations to the infrastructure.

Example Architecture

Multi-cloud computing architecture includes the components and subcomponents that are used for multi-cloud computing. For example, platforms such as a front end platform with front end software architecture, a back end platform with back end software architecture, a network and a multi-cloud based delivery. The front end architecture may include a user interface and enables the user to interact with cloud computing software. Web browsers, local networks and common web apps are examples of the front end software architecture. The back end architecture includes hardware and storage, and includes management and security. FIG. 1A is an illustration 100A of a multi-cloud computing architecture consistent with an illustrative embodiment. It is to be understood that the architecture shown in FIG. 1A is provided for illustrative purposes, and the present disclosure is not in any way limited to the arrangement shown and described. A user interface 105, which may include a server, laptop, desktop, tablet, smart device, etc. communicates with network 120 to access a multi-cloud environment 125, 130, 135, 140 that includes public clouds 125, 130, 135, and a private cloud 140 that is part of an Enterprise® platform 145.

Each of the public clouds 125, 130, 135 can include, for example, computing services 115, database services 117, and storage services 119. One or more of the clouds 125, 130, 135, 140 shown may have fewer services, or more services, than shown. The private cloud 140 that is part of the Enterprise® platform 145 in this illustrative embodiment also includes the computing services 115, database services 117, storage services 119. The hybrid cloud 150 is formed by, for example, a public cloud 135 and the Enterprise® platform 145 having the private cloud 140 managed by a user.

Example Block Diagram

Figure 1B:
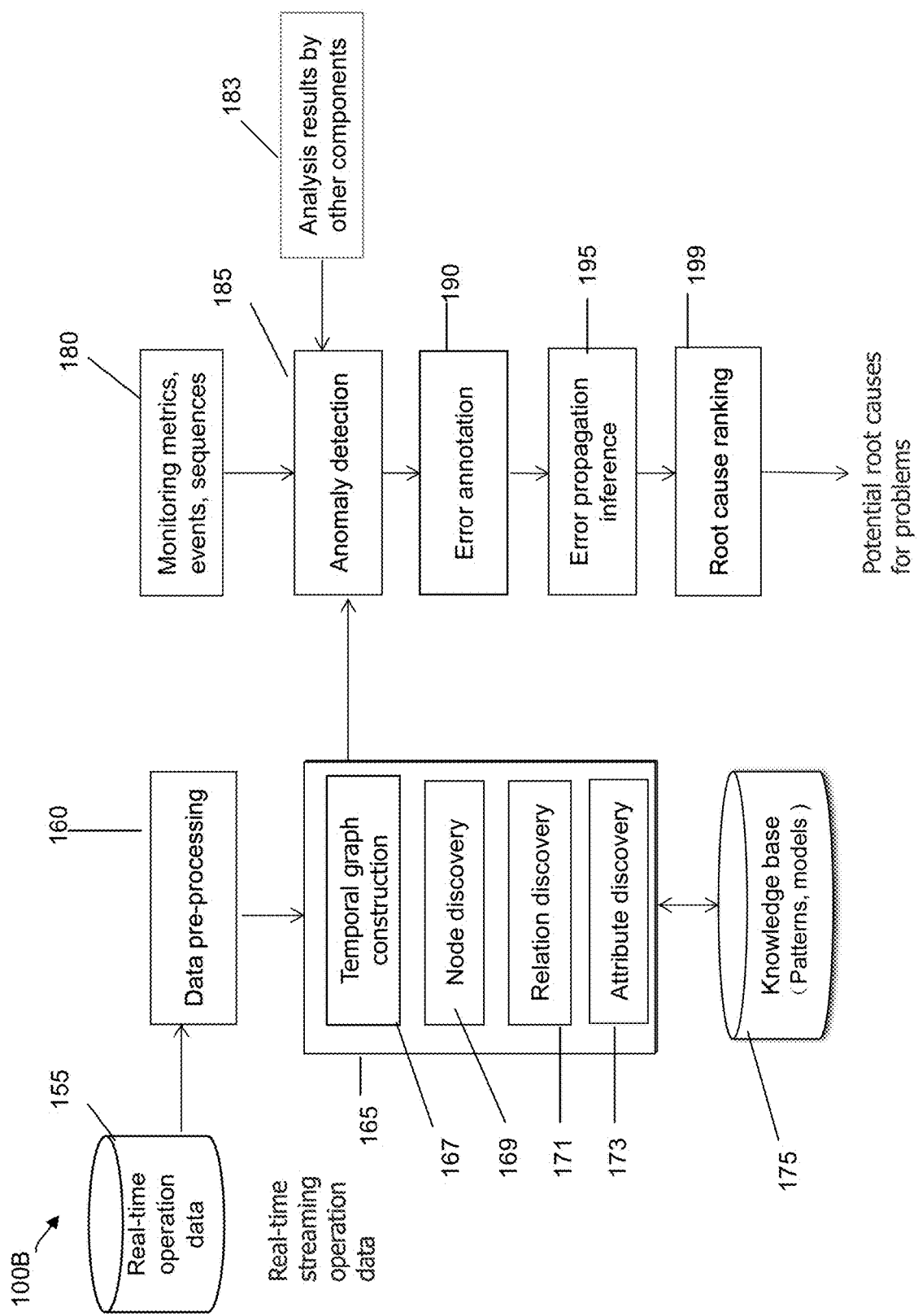
FIG. 1B is an illustration of a system for graph-based problem diagnosis and root cause analysis, consistent with an illustrative embodiment.

Reference now is made to FIG. 1B, which is an example block diagram of a system 100B that is configured to provide a graph-based problem diagnosis and root cause analysis, consistent with an illustrative embodiment. Real time operation data 155 includes operations objects, relations (e.g., correlation, type, direction) and attributes. By extracting one or more of the aforementioned items from the operation data, a temporal graph can be constructed that serves as a basis diagnosis and root cause analysis for IT operations. The temporal graph can represent various levels and operations of a multi-cloud and/or hybrid cloud environment. Data pre-processing module 160 is used, for example, as a precursor to data mining. The data pre-processing module 160 can perform operations such as data cleansing, as well as editing, reduction into a more simplified form, and possible changing formats (wrangling) to facilitate further processing.

A graph construction module 165 is configured to extract various items from the operation data 155 and generate a temporal graph. While in this illustrative embodiment the graph is embodied as a node and edge graph, it is to be understood that other types of temporal graphs, or even a graph that is non-temporal, can be generated for use. Various modules are configured for temporal graph construction 167, node discovery 169, relation discovery 171, attribute discovery 173. It is to be understood that the arrangement of the modules are presented for illustrative purposes and the arrangement is not limited to the arrangement in FIG. 1B.

A knowledge base 175 includes patterns, models, etc., that may be utilized in the attribute discovery, node discovery, and relation discovery. The anomaly detection module 185 is configured to work in conjunction with the monitoring metrics, events, and sequences module 180, as well as analysis results from other components 183. Modules for error annotation 190, error propagation inference 195, and root cause ranking 199 can be configured to generate a list of potential root causes that may be ranked as the reason for detected anomalies and errors.

Figure 2:
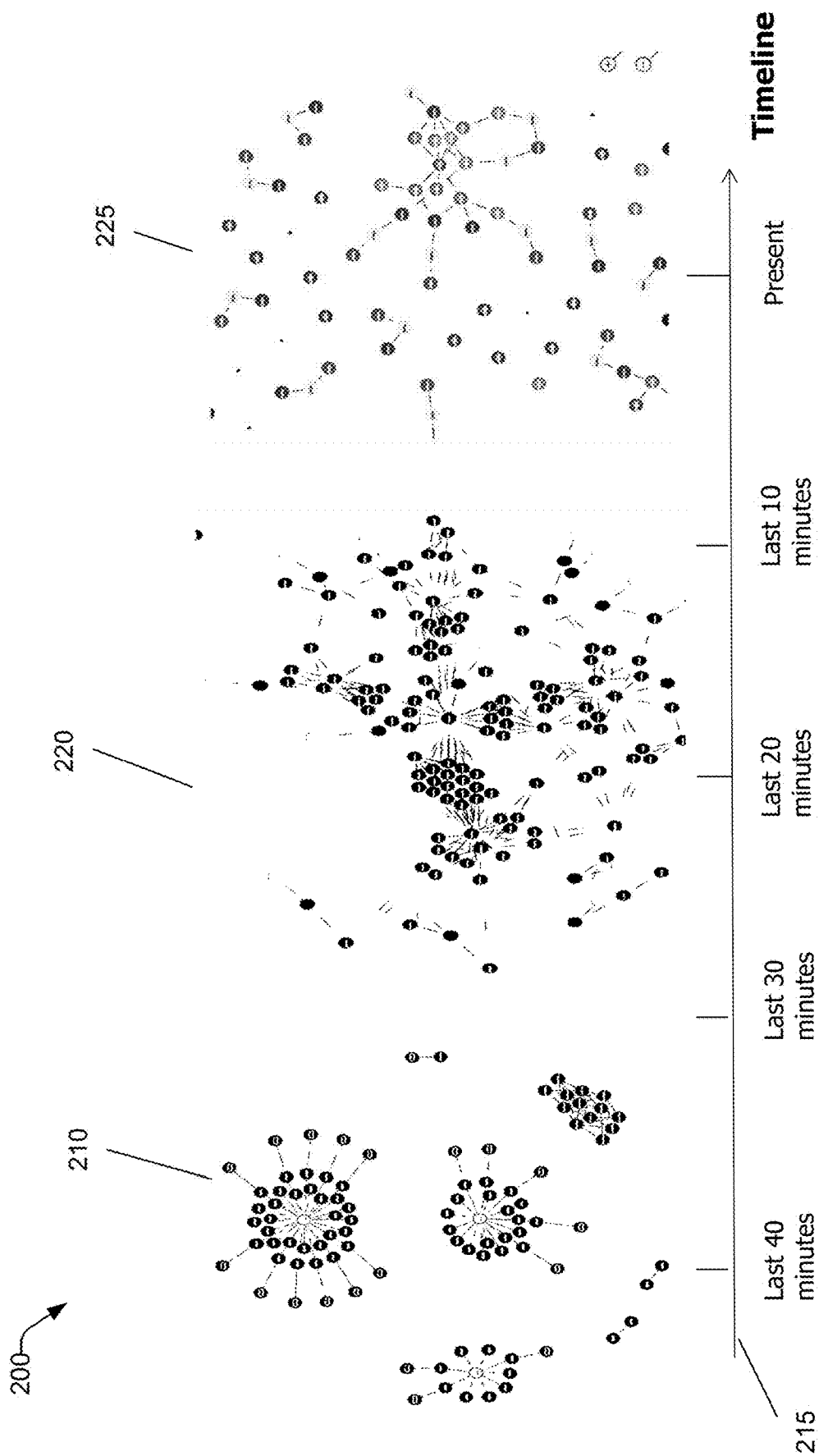
FIG. 2 is an illustration of a temporal graph generated by the system of FIG. 1, consistent with an illustrative embodiment.

FIG. 2 is an illustration of a temporal graph generated by the system of FIG. 1, consistent with an illustrative embodiment. FIG. 2 shows a timeline with a node and edge graph. In this illustrative embodiment, the temporal graph shows three success graphical images 210, 220, and 225 over a duration indicated by the timeline 215. The temporal graph displays results from a 40 minute period to a "present" time period. The patterns of the nodes are analyzed to determine if there is a graphical display that can be indicative of an error or an anomaly that can infer a there is a root cause. A temporal graph, such as shown in FIG. 2, can provide a more complete indication of the operation of the system across multiple levels and across multiple clouds or a hybrid cloud architecture.

Figure 3:
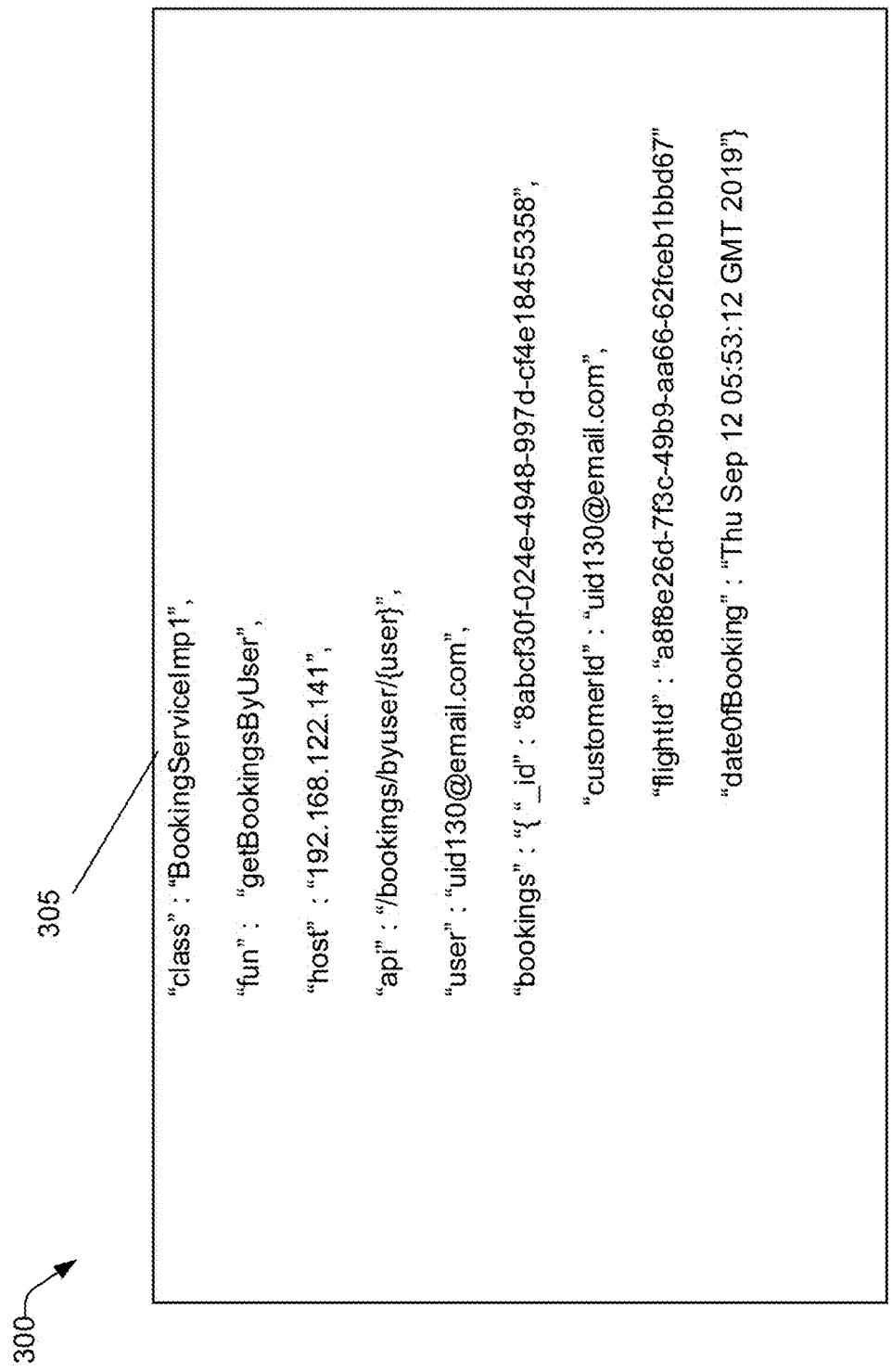
FIG. 3 is an illustrative example of log data, consistent with an illustrative embodiment.

FIG. 3 is an illustrative example 300 of log data 305, consistent with an illustrative embodiment. Operational data, which is in this illustrative embodiment stored in logs, can have attributes that can be identified and extracted. There are various fields such as "class", "fun", "host", "api", "user", "bookings", "id", "customerID", "flightId" and "dateofBooking". The fields in the log include various attributes, and the type of attributes can be text, numerical, or a combination of numerical and text attributes.

Figure 4A:
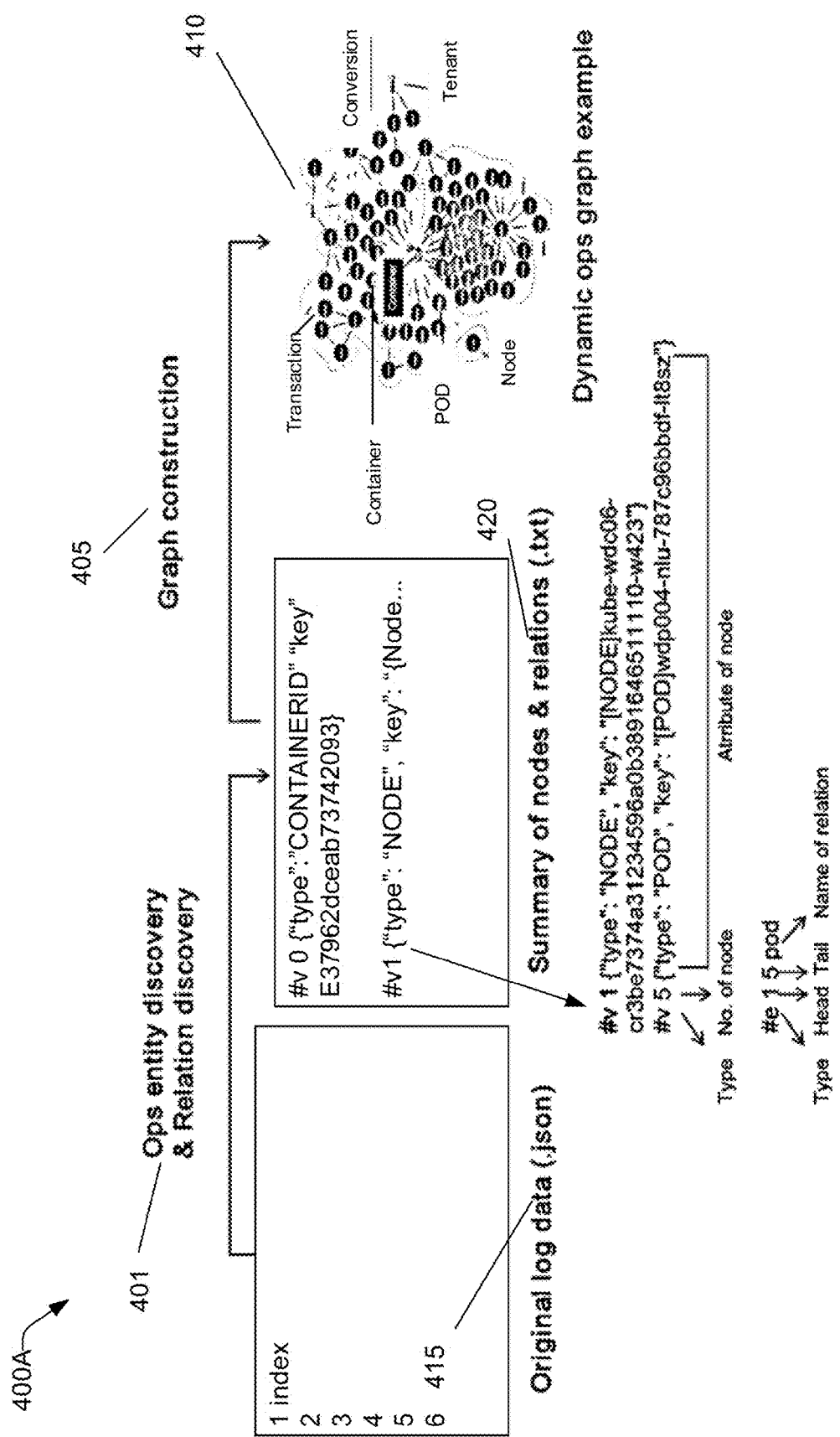
FIGS. 4A and 4B provide an overview of graph construction, and an example of a graphical inference, consistent with an illustrative embodiment.
Figure 4B:
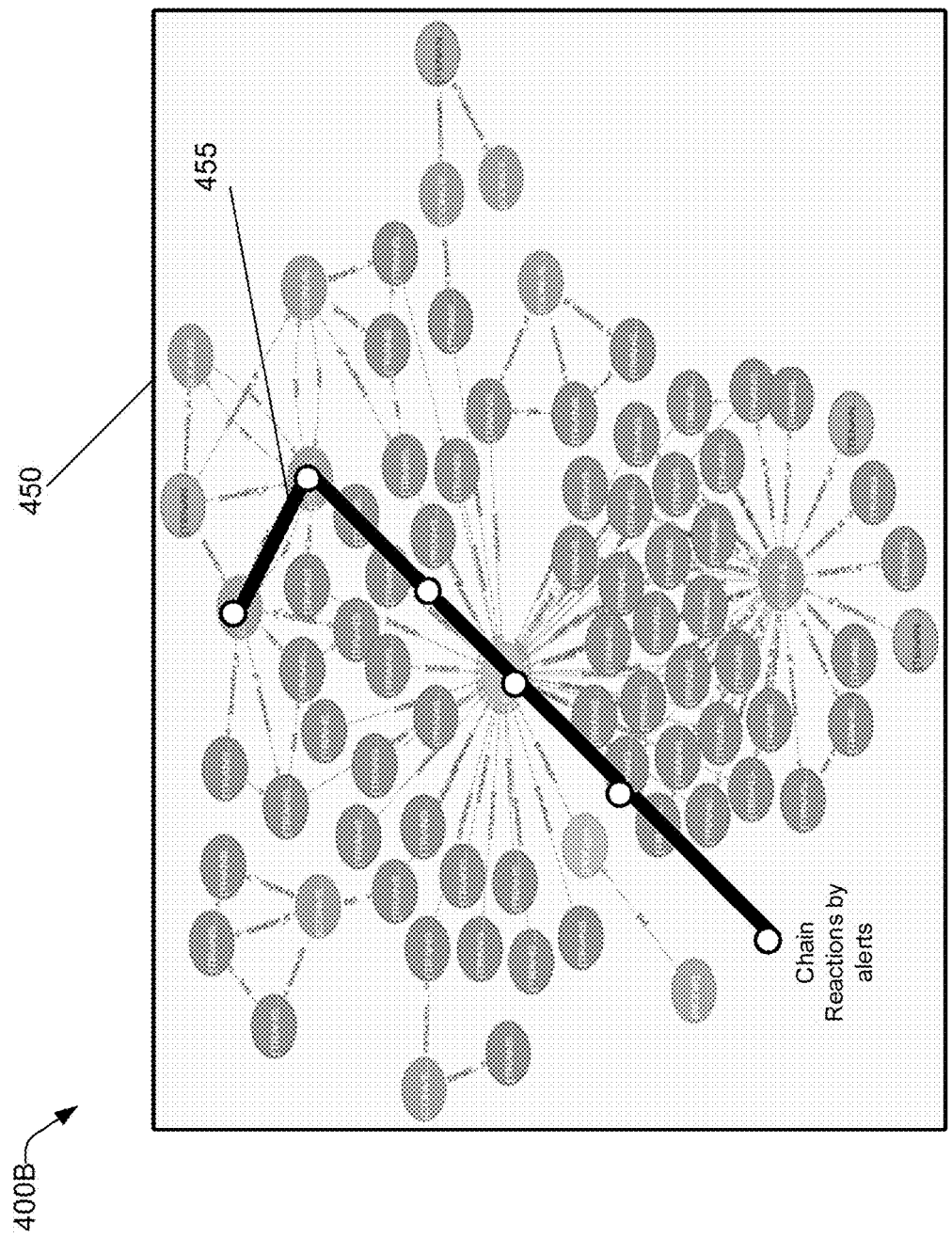

FIGS. 4A and 4B provide an overview 400A of operation entity discovery, relation discovery, graph construction, and an operation graphical inference, consistent with an illustrative embodiment. There is shown an example of an operation entity discovery and a relation discovery 401. These are shown in the form of log data 415 and a summary of nodes and relations 420. Below block 420 is an extracted example for clarity. Items such as the node type (#v1), the key, attribute of the node, and information such as the head, tail, name of relation, that is used in graphical construction to provide the edges between the nodes, and a direction.

With continued reference to FIGS. 4A and 4B, there is a graph construction 405 with an example of a dynamic operation graph 410. The nodes and edges are displayed and descriptive information including the identification of the transaction, container, point of delivery (POD), Node tenant and conversion are all provided. FIG. 4B shows a chain reaction 455 based on the nodes alerts in the graph. The nodes in the alert are identified in the chain reaction. An inference to potent causes and the root cause of all of these alerts based on the pattern in the temporal graph.

Figure 5:
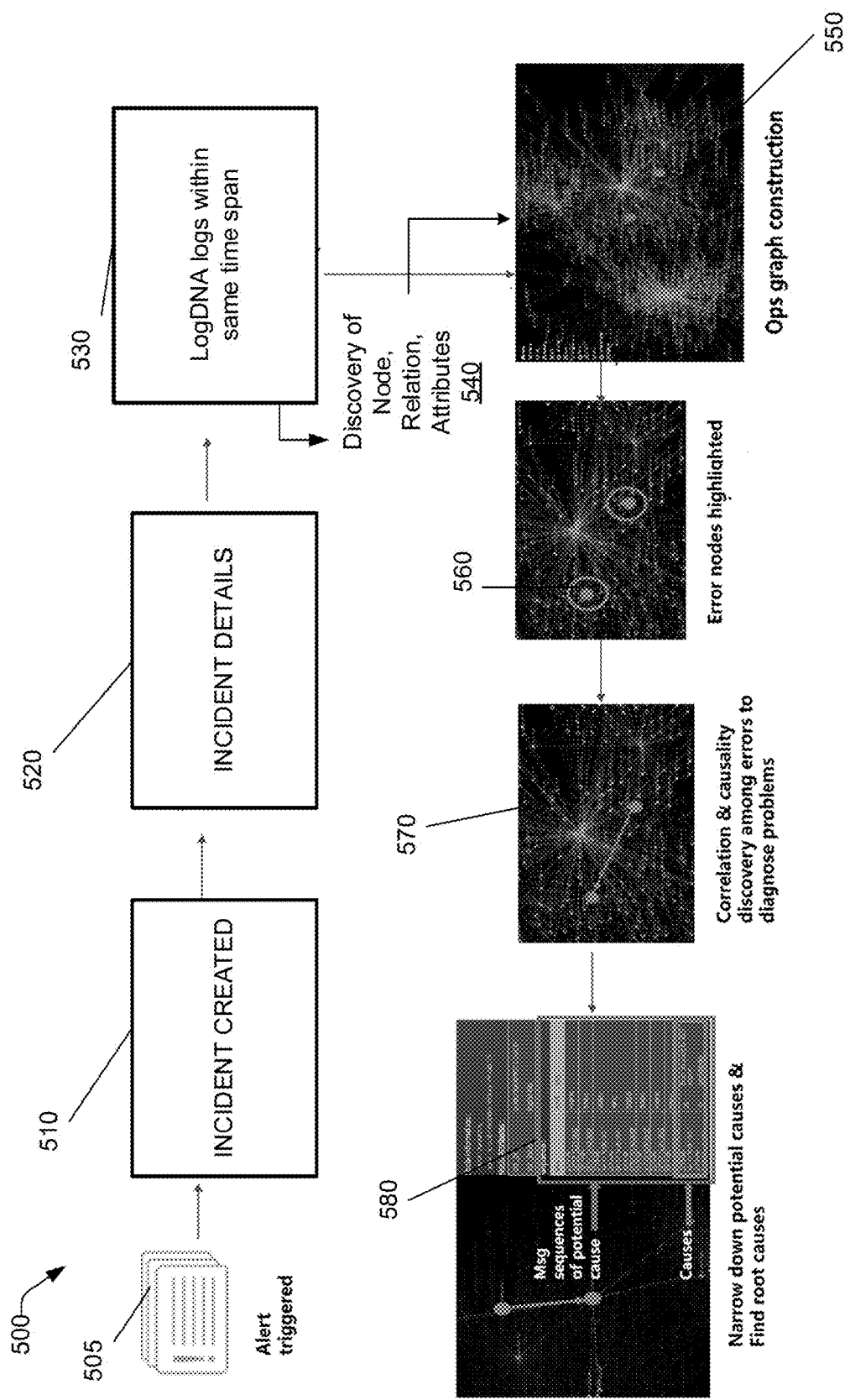
FIG. 5 is a flow diagram of an incident management lifecycle, consistent with an illustrative embodiment.

FIG. 5 is an illustrative example of a flow diagram of an incident management lifecycle, consistent with an illustrative embodiment. An alert 505 is triggered, and an incident is created 510. At 520 the incident details of the alert are analyzed and at 530 logs within the same time span as the incident alert are analyzed. At operation 540, there is a discovery of node relations and attributes, and at operation 550 an ops graph is constructed. At operation 560, the error nodes are highlighted on the graph. At operation 570, the correlation and causality discovery among errors that are graphically displayed are used to diagnose problems. At operation 580, potential causes are narrowed down and one or more root causes for the triggered alert identified. The potential causes and the root causes can then be output for further evaluation. Alternatively, or in addition, diagnostic routines can be run to confirm the root cause.

Example Processes

Figure 6:
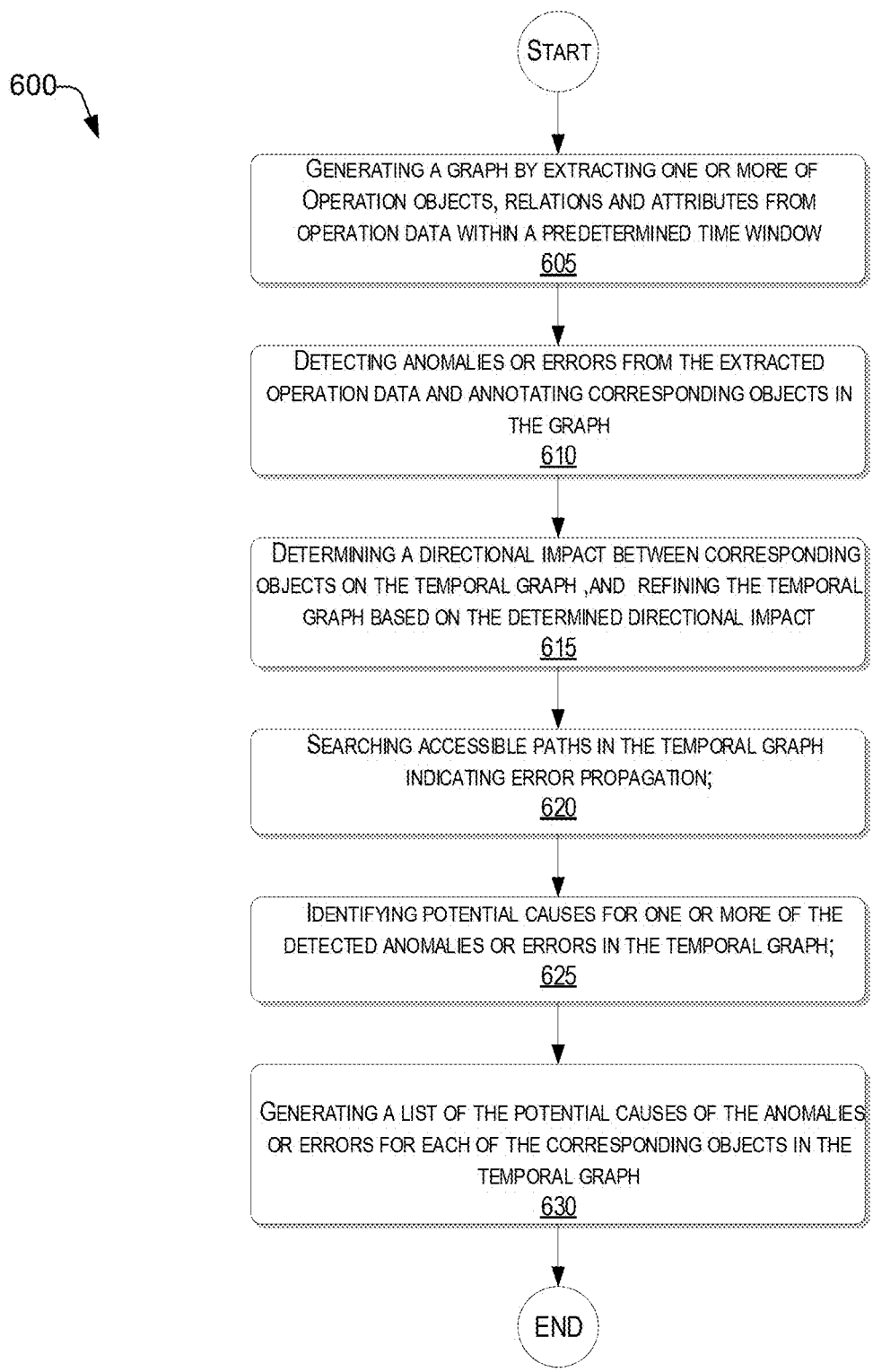
FIG. 6 is a flowchart illustrating operations of a graph-based problem diagnosis and root cause analysis, consistent with an illustrative embodiment.

With the foregoing conceptual block diagram of a system 100, it may be helpful now to consider a high-level discussion of an example process. To that end, FIG. 6 presents an illustrative process related to various aspects of graph-based problem diagnosis, consistent with an illustrative embodiment. Process 600 is illustrated in a logical flowchart, wherein each block represents a sequence of operations that can be implemented in hardware, software, or a combination thereof. In the context of software, the processes represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process.

At operation 605, a temporal graph is generated by extraction of one or more of operation objects, relations, and attributes from operation data within a predetermined time window. While a node and edge temporal graph are shown in the previous discussion hereinabove, the present disclosure is not limited to the generation of such a graph. In one embodiment, a graph generation module, such as shown in FIG. 1, may generate the graph.

At operation 610, the detected anomalies and/or errors that have been extracted from the operation data are annotated as corresponding objects in the based on the errors. Certain nodes on the graph can be identified, and may be highlighted.

At operation 615, a directional impact is determined between corresponding objects on the temporal graph. The temporal graph is refined based on the determined directional impact. In the case of nodes and edges, the placement and direction of the edges is refined based on the determined directional impact.

At operation 620, accessible paths are searched in the temporal graph indicating error propagation. For example, FIG. 4B shows a path of alert nodes where an error propagation has occurred.

At operation 625, potential causes for the one or more anomalies in the temporal graph are identified.

At operation 630, a list of the potential causes is generated for each of the corresponding objects in the temporal graph. The potential causes may be ranked by the root cause ranking module 150 (see FIG. 1), and the first ranked potential cause may be the root cause. In another embodiment, there may be additional processing of the list of potential causes to infer the root cause. The process then ends, but in a dynamic operation, may continuously or periodically perform the operations of FIG. 6.

Example Computer Platform

Figure 7:
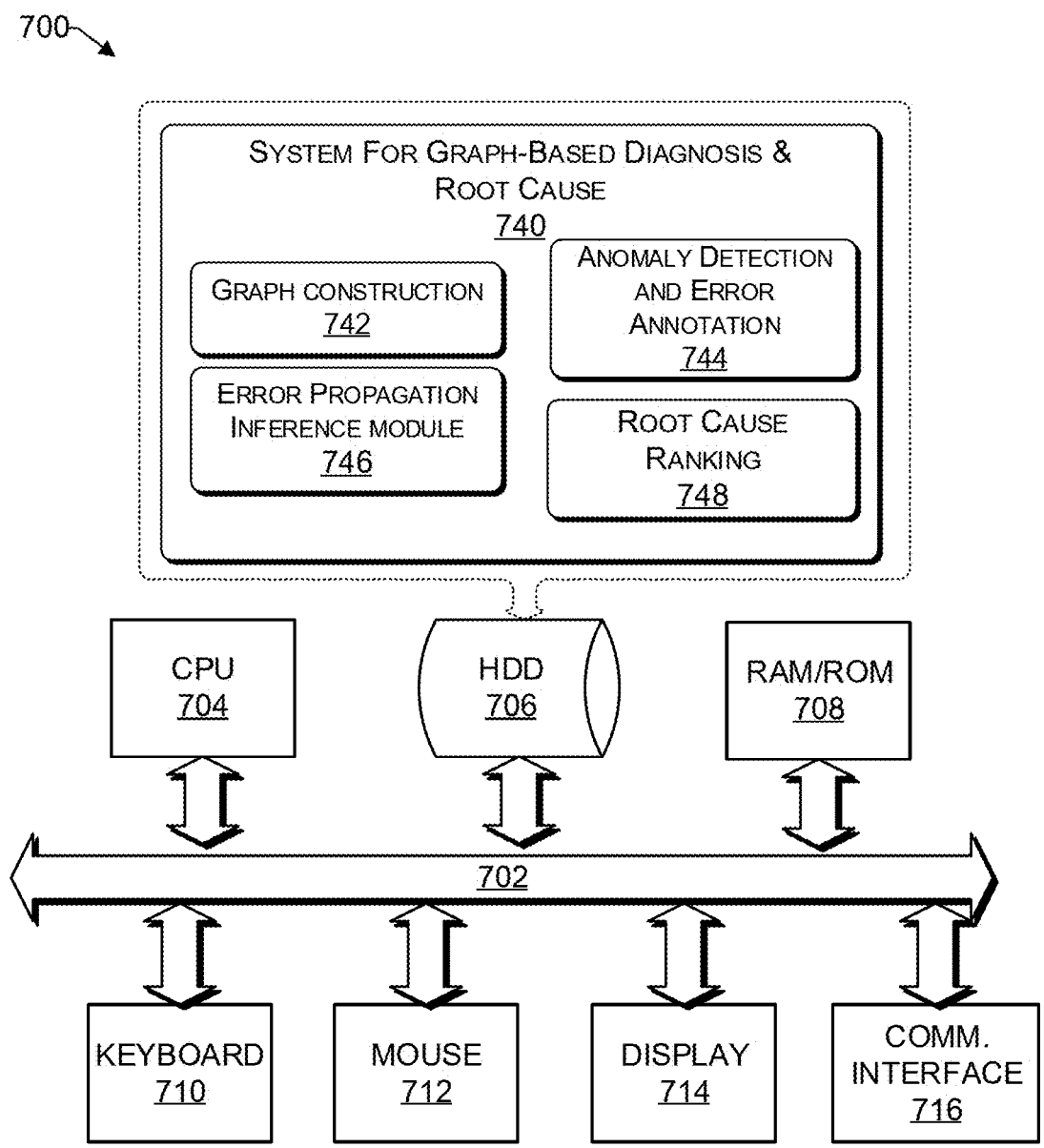
FIG. 7 is a functional block diagram illustration of a computer hardware platform that can communicate with various networked components, consistent with an illustrative embodiment.

Referring now to FIG. 7, functions relating to attribute discovery for operation objects from operation data can be performed with the use of one or more computing devices connected for data communication via wireless or wired communication, as shown in FIG. 1A and in accordance with the processes 500 and 600 of FIGS. 5 and 6, respectively. FIG. 7 provides a functional block diagram illustration of a computer hardware platform that is capable performing attribute discovery for operation objects from operation data, as discussed herein. In particular, FIG. 7 illustrates a network or host computer platform 700, as may be used to implement an appropriately configured server, such as the server 105 of FIG. 1A.

The computer platform 700 may include a central processing unit (CPU) 704, a hard disk drive (HDD) 706, random access memory (RAM) and/or read only memory (ROM) 708, a keyboard 710, a mouse 712, a display 714, and a communication interface 716, which are connected to a system bus 702.

In one embodiment, the HDD 706, has capabilities that include storing a program that can execute various processes, such as the system for graph-based diagnosis and root cause analysis 740, in a manner described herein. The engine system may have various modules configured to perform different functions.

For example, there may be a graph construction module 742 that is configured to generate a temporal graph by extracting operation objects, relations and attributes from operation data to reveal nodes and edges.

In one embodiment, there is an anomaly detection and error annotation module 744 configured to detect anomalies and annotate corresponding objects in the generation graph. An error propagation inference module 746 is configured to determine the impact between each of two nodes and refine the graph according to the type of graph. In addition, the error propagation module 746 searches all accessible paths indicating error propagation and identifies potential causes for each annotated node. A root cause ranking module 748 is configured to rank all the potential causes and a root cause ranked for each of the corresponding objects in the temporal graph.

In one embodiment, a program, such as Apache™, can be stored for operating the system as a Web server. In one embodiment, the HDD 706 can store an executing application that includes one or more library software modules, such as those for the Java™ Runtime Environment program for realizing a JVM (Java™ virtual machine).

Example Cloud Platform

Figure 8:
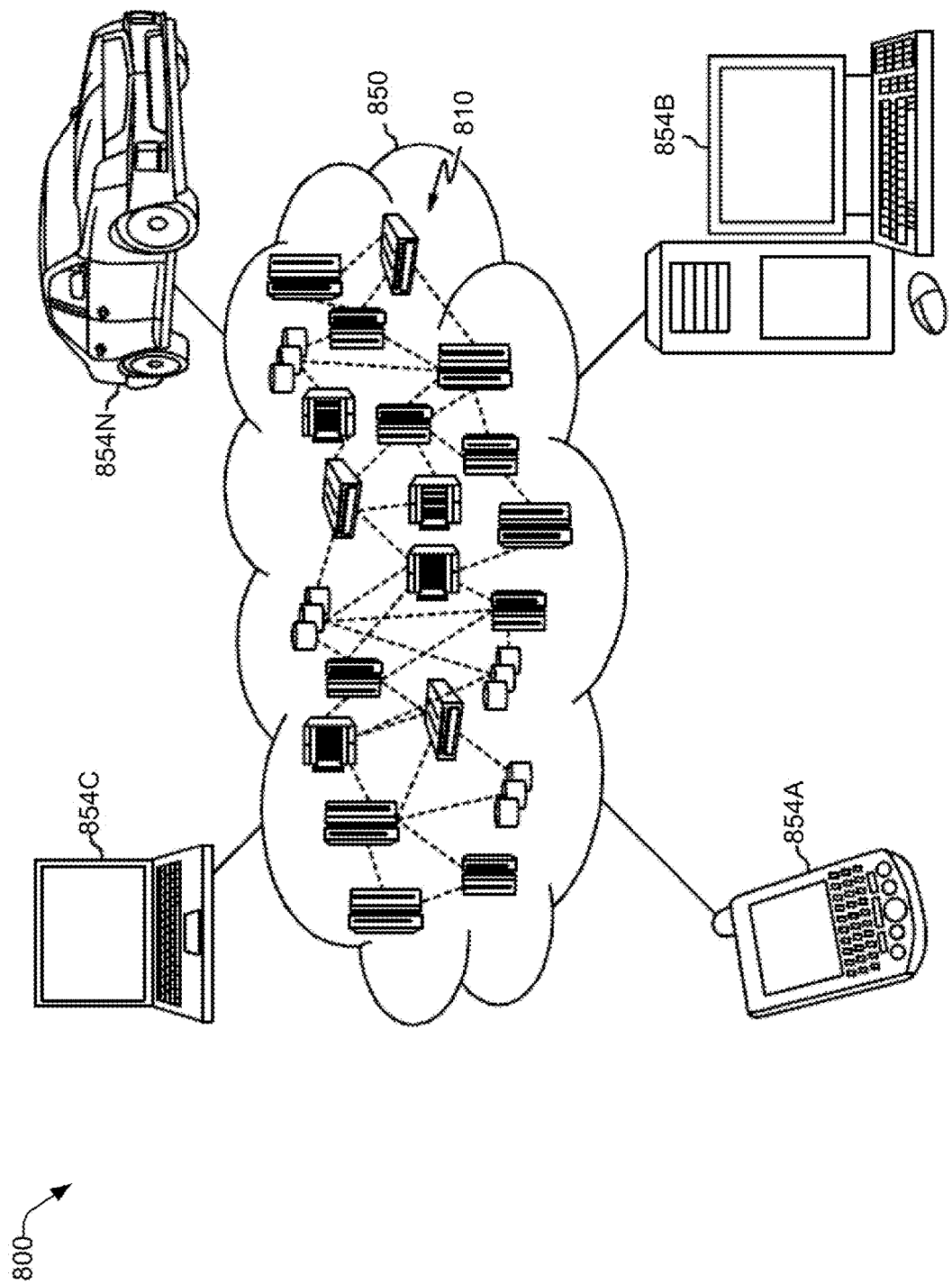
FIG. 8 depicts a cloud computing environment, consistent with an illustrative embodiment.

As discussed above, functions relating to managing one or more client domains, may include a cloud 850 (see FIG. 8). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, an illustrative cloud computing environment 800 is depicted. As shown, cloud computing environment 800 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
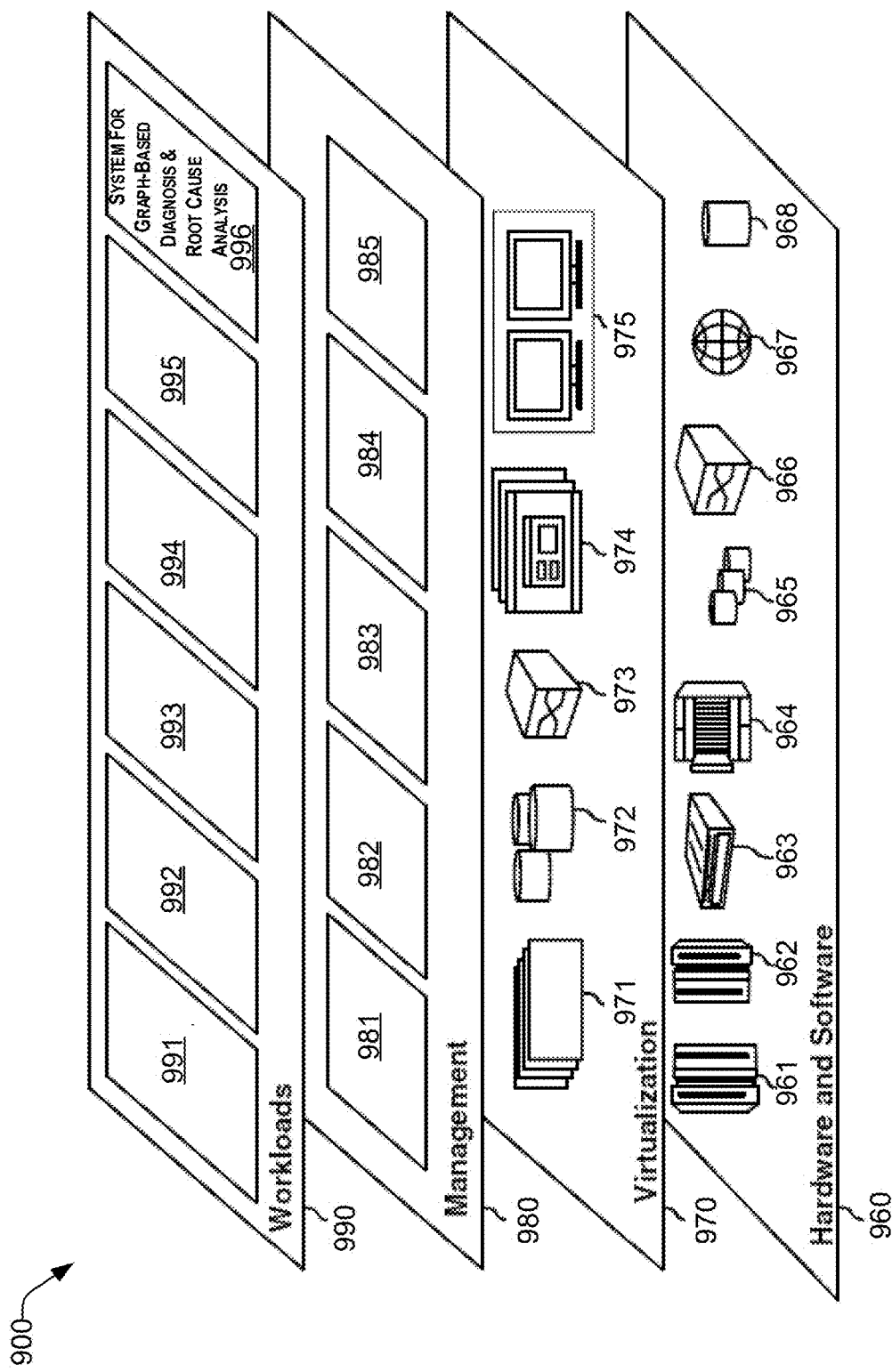
FIG. 9 depicts abstraction model layers, consistent with an illustrative embodiment.

Referring now to FIG. 9, a set of functional abstraction layers 900 provided by cloud computing environment 850 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and the System for Graph-Based Diagnosis and Root Cause Analysis 996, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. For example, while the illustrative embodiments herein are shown and described with a silicon carrier, the present disclosure is not limited to a silicon carrier. The contact elements may include lands, pads, grooves, pins, sockets, etc., just to name a few non-limiting examples. Contact materials may include one or more metallic or non-metallic electrically conductive materials, including but not limited to copper, alloys with copper, aluminum, conductive polymers. Doubly redundant interconnects increase reliability and may increase performance, but the present disclosure is not limited to such construction. The batteries may be connected in series or parallel by masking/unmasking battery contacts and/or by C4 bonding, or not bonding pads. The batteries may have a solid state form factor matched to the protective lid/electrical flexible cable.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip may be mounted in a single chip package (such as a plastic carrier, with leads that are affixed to a motherboard or other higher-level carrier) or in a multichip package (such as a ceramic carrier that has either or both surface interconnections or buried interconnections). In any case, the chip can then be integrated with other chips, discrete circuit elements, and/or other signal processing devices as part of either (a) an intermediate product, such as a motherboard, or (b) an end product. The end product can be any product that includes integrated circuit chips, ranging from low-end applications, such as toys, to advanced computer products having a display, a keyboard or other input device, and a central processor.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for a graph-based analysis for an Information Technology (IT) operation, comprising:
    generating a temporal graph by extracting one or more of operation objects, relations, and attributes from operation data of workloads distributed across a plurality of levels of the IT operation within a predetermined time window;
    detecting one or more anomalies from the extracted operation data and annotating corresponding objects in the graph, by highlighting the detected one or more anomalies within the graph;
    determining a directional impact between corresponding objects on the temporal graph;
    refining the temporal graph based on the determined directional impact;
    searching one or more accessible paths in the temporal graph indicating an error propagation;
    identifying potential causes for at least one of the detected anomalies in the temporal graph; and
    generating a list of the potential causes of the at least one of the detected anomalies for each of the corresponding objects in the temporal graph.

2. The computer-implemented method according to claim 1, further comprising performing the IT operations in a hybrid cloud or multi-cloud environment from which the extracting of the operation objects from operation data is performed.

3. The computer-implemented method according to claim 1, wherein the generating of the temporal graph includes extracting relations comprising at least one of a correlation, type, or direction.

4. The computer-implemented method according to claim 1, wherein the detecting the one or more anomalies includes detecting one or more of metrics, time-series data, sequences, or graph-structure exceptions.

5. The computer-implemented method according to claim 1, wherein identifying the potential causes of the one or more anomalies in the temporal graph includes determining one or more of a depth or level in the temporal graph and a deviation from an expected depth or level in the temporal graph.

6. The computer-implemented method according to claim 5, further comprising:
    determining at least one root cause of the one or more anomalies in the temporal graph; and
    ranking the identified potential causes of the anomalies based on the at least one root cause.

7. The computer-implemented method according to claim 6, wherein the generating of the temporal graph comprises:
    generating a node and edge graph by the extracting of operation objects, relations and attributes; and
    annotating each node of the node and edge graph.

8. The computer-implemented method according to claim 7, wherein:
    the list of the potential causes of the at least one of the detected anomalies is generated for each annotated node; and
    determining a root cause based on the identified potential causes of the anomalies for each annotated node.

9. The computer-implemented method according to claim 8, wherein refining the temporal graph comprises determining a directional impact between two nodes on the temporal graph and adjusting the edges.

10. A computing system for a graph-based analysis for Information Technology (IT) operations, comprising:
a graph construction module stored in a memory of the computing system, configured to generate a temporal graph extracted from operation data including operation objects, relations, and attributes of workloads distributed across a plurality of levels of the IT operations within a predetermined time window;
an anomaly detection and error annotation module stored in a memory of the computing system, configured to detect anomalies and annotate corresponding objects in the temporal graph by highlighting the detected one or more anomalies in the temporal graph;
an error propagation inference module stored in a memory of the computing system, configured to:
determine a directional impact between corresponding objects on the temporal graph;
refine the temporal graph based on the determined directional impact;
search accessible paths in the temporal graph indicating error propagation; and
identify one or more potential causes of the anomalies for one or more of the detected anomalies in the temporal graph; and
a root cause ranking module stored in a memory of the computing system configured to generate a ranked list of the potential causes of the anomalies for each of the corresponding objects in the temporal graph.

11. The computing system according to claim 10, wherein the IT operations are executed in a hybrid cloud or multi-cloud environment wherein the extraction of the operation objects from operation data is performed.

12. The computing system according to claim 10, wherein the graph construction module is configured to extract relations comprising one or more of correlation, type, or direction from the operation data.

13. The computing system according to claim 10, wherein the anomaly detection and error annotation module is configured to detect the anomalies from one or more of metrics, time-series data, sequences, or graph-structure exceptions.

14. The computing system according to claim 10, wherein the error propagation inference module is configured to identify the one or more potential causes of the anomalies in the temporal graph by determining one or more of a depth or level in the temporal graph and a deviation from an expected depth or level in the temporal graph.

15. The computing system according to claim 14, wherein the error propagation inference module is further configured to determine at least one root cause of the anomalies in the temporal graph.

16. The computing system according to claim 15, wherein:
the graph construction module is configured to generate a node and edge graph by the extracting the operation objects, relations and attributes; and
the anomaly detection and error annotation module is further configured to annotate each node of the node and edge graph.

17. The computing system according to claim 16, wherein the anomaly detection and error annotation module is further configured to:
generate the list of the potential causes of the anomalies for each annotated node; and
to determine a root cause of the identified potential causes of the anomalies for each annotated node.

18. The computing system for a graph-based analysis according to claim 17, wherein the anomaly detection and error annotation module is further configured to refine the temporal graph by determining a directional impact between two nodes on the temporal graph and adjusting the edges.

19. A non-transitory computer readable storage medium tangibly embodying a computer readable program code having computer readable instructions that, when executed, causes a computer device to perform a method of attribute discovery for operation objects from operation data, the method comprising:
generating a temporal graph by extracting one or more of operation objects, relations and attributes from operation data of workloads distributed across a plurality of levels of the IT operation within a predetermined time window;
detecting one or more anomalies from the extracted operation data and annotating corresponding objects in the graph by highlighting the detected one or more anomalies within the graph;
determining a directional impact between corresponding objects on the temporal graph;
refining the temporal graph based on the determined directional impact;
searching accessible paths in the temporal graph indicating error propagation;
identifying potential causes for one or more of the detected anomalies in the temporal graph; and
generating a list of the potential causes of the anomalies for each of the corresponding objects in the temporal graph.

20. The non-transitory computer readable storage medium according to claim 19, wherein the generating of the temporal graph comprises:
generating a node and edge graph by the extracting operation objects, relations and attributes;
annotating each node of the node and edge graph; and
determining a root cause of the identified potential causes of the anomalies for each annotated node.

* * * * *